Jan. 28, 1941.　　G. C. NERBOVIG　　2,229,815
DEVICE FOR APPLYING LIQUID TO WINDSHIELDS
Filed July 5, 1938　　2 Sheets-Sheet 1
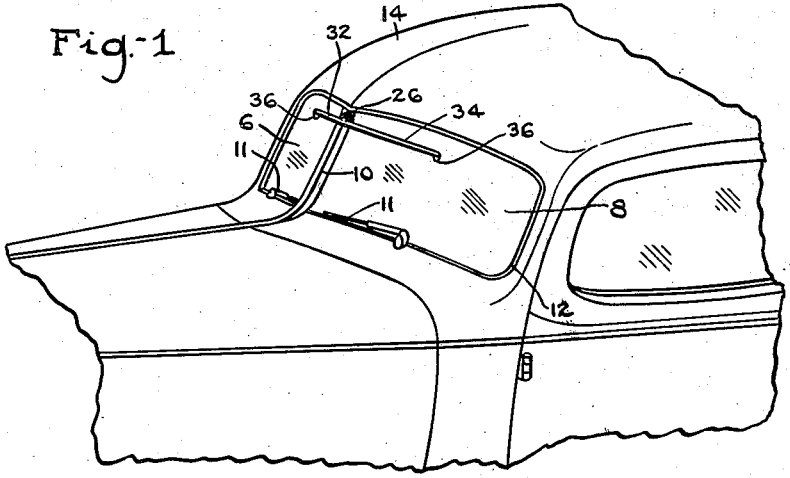
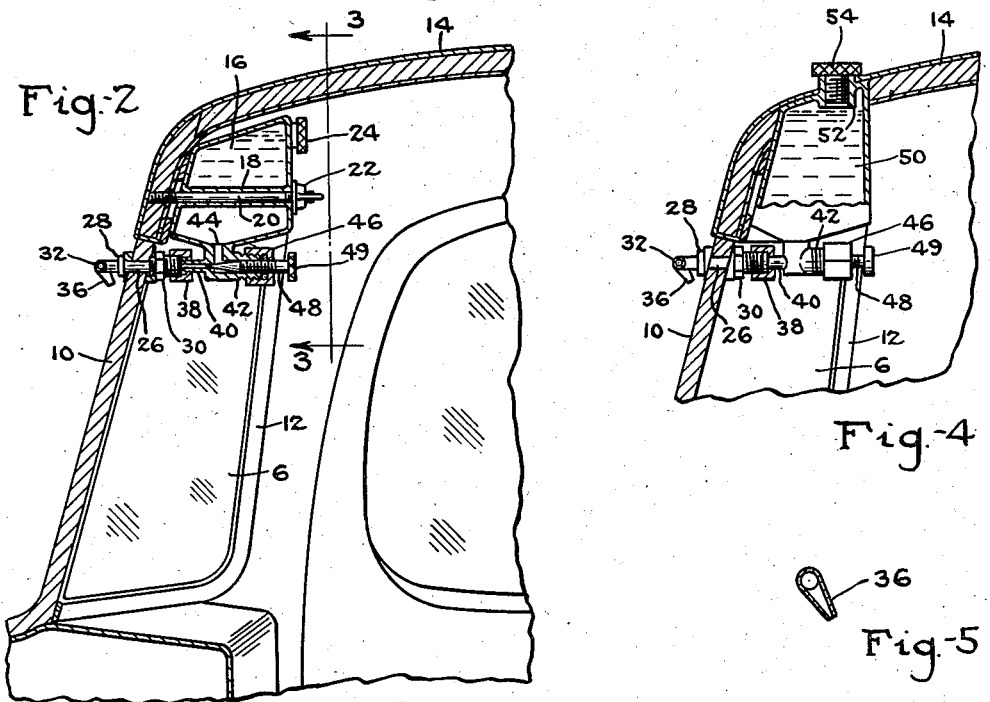
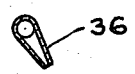
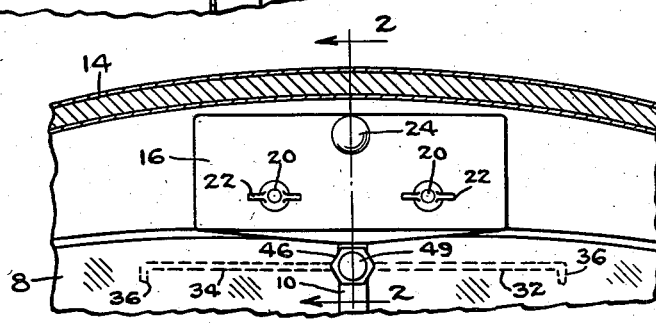
Inventor:
George C. Nerbovig.
By Whiteley and Ruckman
Attorneys.

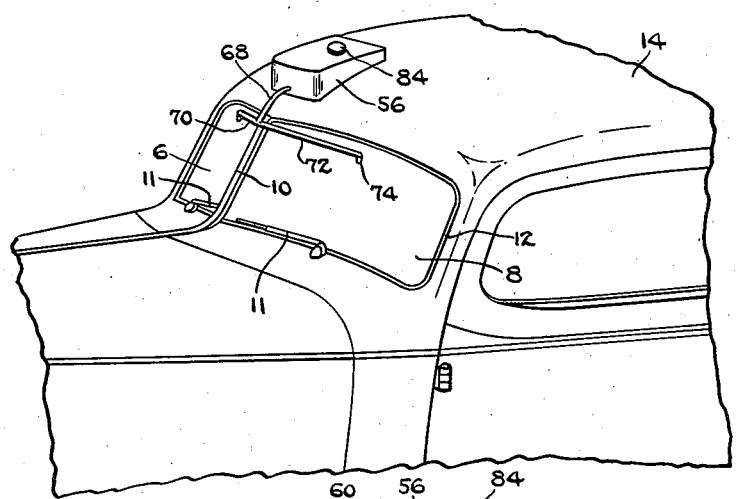
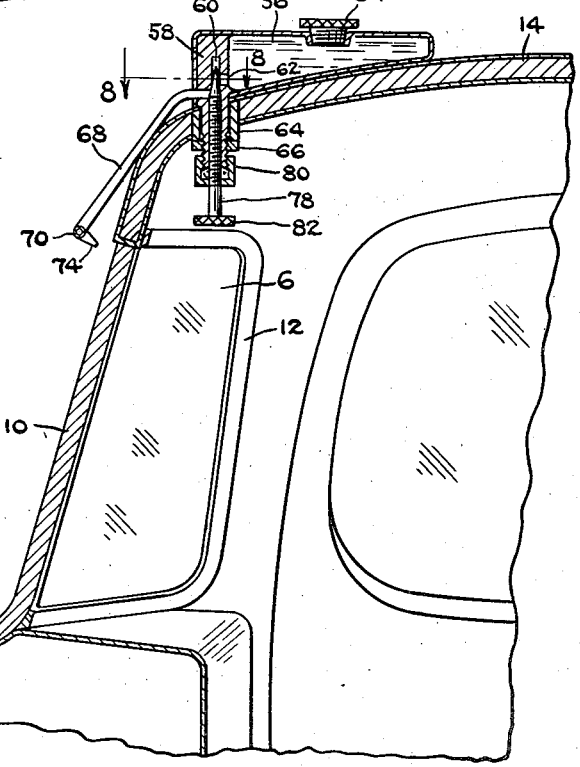
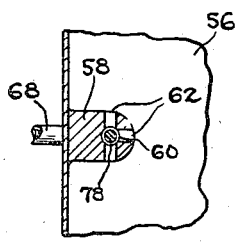

Patented Jan. 28, 1941

2,229,815

UNITED STATES PATENT OFFICE 2,229,815

DEVICE FOR APPLYING LIQUID TO WINDSHIELDS

George C. Nerbovig, Sioux Falls, S. Dak.

Application July 5, 1938, Serial No. 217,464

1 Claim. (Cl. 20—40.5)

My invention relates to devices for applying liquid to windshields. It relates particularly to such devices for use with vehicles which are adapted to be driven at high speed by motors such as internal combustion engines. In this particular, the term "vehicle" is to be considered as applying to automobiles, trucks, and aeroplanes as well as to cars which run on tracks. An object of the invention is to provide a device to be used in conjunction with the windshield wiper to remove all dirt, dust, insects and so forth in order to give a clear vision to the driver and passengers of the vehicle. Another object of the invention is to provide a device of this character which can be built into the vehicle or can be attached to a vehicle already built. Another object is to provide a device by means of which a suitable liquid such as water may be delivered from a source of supply by gravity feed controlled by a valve in order that the operator may at any desired time cause the proper quantity of the liquid to be delivered in front of the windshield for cleaning purposes in conjunction with the windshield wiper.

The novel features which I believe to be characteristic of my invention are set forth with particularity in the appended claim. The invention itself, however, both as to organization and method of operation, together with additional objects and advantages thereof, will be best understood from the following description of specific embodiments when read in connection with the accompanying drawings in which, Fig. 1 is a perspective view showing the front of a windshield having the device applied.

Fig. 2 is a longitudinal sectional view showing one form of the device applied to a windshield.

Fig. 3 is a transverse view on the line 3—3 of Fig. 2.

Fig. 4 is a view corresponding to Fig. 2 and showing another form of the device.

Fig. 5 is a detail section view of a nozzle.

Fig. 6 is a perspective view of another form of the invention.

Fig. 7 is a central section thereof.

Fig. 8 is a detail view in section on the line 8—8 of Fig. 7.

Referring to the drawings, the numerals 6 and 8 designate the two halves of a windshield joined by a middle reinforcing strip 10 and provided with wipers 11. The surrounding frame of the windshield is designated by the numeral 12. The roof or top of the vehicle is designated by the numeral 14.

The form of device shown in Figs. 2 and 3 which is adapted to be applied to a vehicle after it has been built will be first described. A container 16 for holding cleaning liquid is secured within the vehicle in the space underneath the forward portion of the roof and located above the level of the windshield. The container 16 may be made of any suitable shape and material. Within this container, two spaced sleeves 18 extend between the front and rear walls thereof. Rods 20 threaded at their ends pass through the sleeves 18 and are turned into the front of the vehicle. Wing nuts 22 for the rear ends of the rods 20 are turned down upon the rear wall of the container. The container is provided with a filling opening at its rear adapted to be closed by a screw plug 24. A tube 26 externally threaded at its front and rear extends through the reinforcing strip 10 and is secured in place by a front nut 28 and a rear nut 30. From the front end of the tube 26, branches 32 and 34 extend in opposite directions horizontally and terminate in nozzles 36 which are directed to spray liquid onto the upper front portions of the two windshield members 6 and 8. The liquid, when it runs down the windshield members, acts in conjunction with the wipers 11 for cleaning purposes. It will be noted that the nozzles or openings at the ends of the branches are in substantially vertical planes with the axes of the wipers.

The threaded rear end of the tube 26 is connected by a coupling member 38 with a tubular projection 40 extending from a member 42 attached to the bottom of the container 16. The member 42 contains a bore in alinement with the passageway in the projection 40 and this bore is connected by a passageway 44 with the interior of the container 16. The rear end of the member 42 is provided with a packing gland 46 through which a needle valve 48 extends. This valve cooperates with a valve seat and has a head 49 by which it may be turned to shut off the flow of liquid and may be turned in the opposite direction to the desired extent for controlling the volume of liquid which is delivered. In order to fill the container to the best advantage, it may be removed upon taking off the wing nuts 26 and loosening the coupler 38 from the tube 26.

The form of device shown in Fig. 4 is more readily adaptable for building into the vehicle. In this form of the invention, a container 50 is permanently fixed to the upper front portion of the vehicle wall located above the windshield. This container has a filling neck 52 extending up through the roof 14 and closed by a screw plug 54. The delivery portion of the device extending from the bottom of the container is similar to that already described and hence the same reference numerals a. applied in Fig. 4 to this portion of the device.

Another form of the invention is shown in Figs. 6, 7 and 8 in which a container 56 for liquid is supported upon the roof of a vehicle. A member 58 containing a bore 60 is secured to the front wall of the container 56 and this bore is in communication with the lower interior portion of the container through one or more ports 62. The member 58 extends down through an opening in the roof 14 and has its lower end portion threaded. A spacer 64 around the middle portion of the member 58 has its upper end in engagement with the lower side of the roof. A nut 66 cooperating with the threaded portion of the member 58 engages the lower end of the spacer 64 and serves to securely hold the container in place upon the roof. A tube 68 extends forwardly from the bore 60 below the ports 62 and has branches 70 and 72 extending in opposite directions in front of the windshield. Nozzles 74 on the extremities of the branches serve to direct the liquid onto the upper portion of the windshield. The bore 60 just below the ports 62 is provided with a valve seat with which a needle valve 78 cooperates. The stem of this valve extends downwardly out of the bore 60 through a packing gland 80 and is provided with a head 82 by means of which the valve may be operated into closed position and into the desired extent of open position. The container 56 is provided with a filling opening adapted to be closed by a screw plug 84.

The operation and advantages of my invention will be readily apparent in connection with the foregoing description and the accompanying drawings. Whenever the operator desires to clean the windshield from foreign matter, this may be quickly done without stopping the vehicle. All that he has to do is to open the needle valve the proper amount and start the windshield wipers. Liquid will then flow by gravity from the container and be delivered through the nozzles upon the windshield for cooperative action with the wipers. Furthermore when there is a mist or light rain and operation of the wipers results is smearing the windshield, delivery of the liquid from the container will quickly give a clear vision through the windshield. For use in freezing weather, the liquid may be of a non-freezing nature with the result that frost is quickly removed from the windshield.

I claim:

A device for applying liquid to windshields comprising a container for liquid, sleeves connecting two opposite walls of said container, threaded rods extending through said sleeves with one of their ends secured to the vehicle above the windshield, nuts on the other ends of said rods for removably holding said container in place, a member attached to the bottom of said container provided with a bore in communication with the interior of said container, a tube for delivering liquid upon the windshield, a coupler for detachably connecting said tube with said bore containing member, a manually operable valve in said bore containing member, said container having a filling opening, and a closure for said opening whereby provision is made for filling said container when removed from its mounting.

GEORGE C. NERBOVIG.